(12) United States Patent  
Kowalski

(10) Patent No.: US 9,147,871 B2  
(45) Date of Patent: Sep. 29, 2015

(54) AUTOMOTIVE BATTERY CONNECTION SYSTEM

(76) Inventor: Gerald A. Kowalski, Pittsburgh, PA (US)

( * ) Notice: Subject to any disclaimer, the term of this patent is extended or adjusted under 35 U.S.C. 154(b) by 664 days.

(21) Appl. No.: 13/562,427

(22) Filed: Jul. 31, 2012

(65) Prior Publication Data

US 2013/0034765 A1 Feb. 7, 2013

Related U.S. Application Data

(60) Provisional application No. 61/513,773, filed on Aug. 1, 2011.

(51) Int. Cl.
| | |
|---|---|
| *H01R 13/52* | (2006.01) |
| *H01M 2/30* | (2006.01) |
| *H01R 13/642* | (2006.01) |
| *H01R 13/627* | (2006.01) |

(52) U.S. Cl.
CPC ............. *H01M 2/305* (2013.01); *H01R 13/642* (2013.01); *H01M 2220/20* (2013.01); *H01R 13/6273* (2013.01)

(58) Field of Classification Search
CPC .. H01R 13/642; H01R 13/6273; H01R 13/68; H01R 4/5091; H01R 11/285; H01R 13/53; H01R 11/282; H01R 11/287; H01M 2/305; Y10T 24/3439
USPC ......................................................... 439/522
See application file for complete search history.

(56) References Cited

U.S. PATENT DOCUMENTS

| | | | |
|---|---|---|---|
| 5,496,197 | A | 3/1996 | Grivet |
| 6,152,784 | A | 11/2000 | Pyles |
| 6,162,098 | A | 12/2000 | Cheng et al. |
| 6,399,239 | B2 | 6/2002 | Bolstad et al. |
| 6,459,233 | B1 | 10/2002 | Liang |
| 6,629,863 | B2 | 10/2003 | Kieninger et al. |
| 6,805,593 | B2 | 10/2004 | Spaulding et al. |
| 7,344,421 | B1 | 3/2008 | Spencer |
| 7,488,213 | B2 * | 2/2009 | Plummer ................. 439/620.33 |
| 7,924,137 | B2 * | 4/2011 | Rahman et al. ................ 337/187 |
| 8,137,143 | B2 * | 3/2012 | McSweyn et al. ............ 439/770 |
| 8,241,071 | B1 * | 8/2012 | Hayama ........................ 439/709 |

* cited by examiner

*Primary Examiner* — Jean F Duverne  
(74) *Attorney, Agent, or Firm* — McKay & Associates, P.C.

(57) ABSTRACT

An automotive battery connection system, which includes a substantially cylindrical battery case acting as a terminal for an automotive battery. The battery case includes partitions defining a keyway for cables and a center partition dividing the battery case into two case pockets. A battery positive post is situated within one of the case pockets. A battery negative post is situated in the other of the case pockets. A substantially cylindrical plug is adapted to seat on the partitions of the battery case. The plug comprises a pair of sockets defined within its base, each socket defined within one of the plug pockets shaped identical to the battery positive post and the battery negative post and sized to have the battery positive post and the battery negative post securely seat therein. Therefore, cables terminating within the base of the plug are in conductive communication with the sockets.

17 Claims, 3 Drawing Sheets

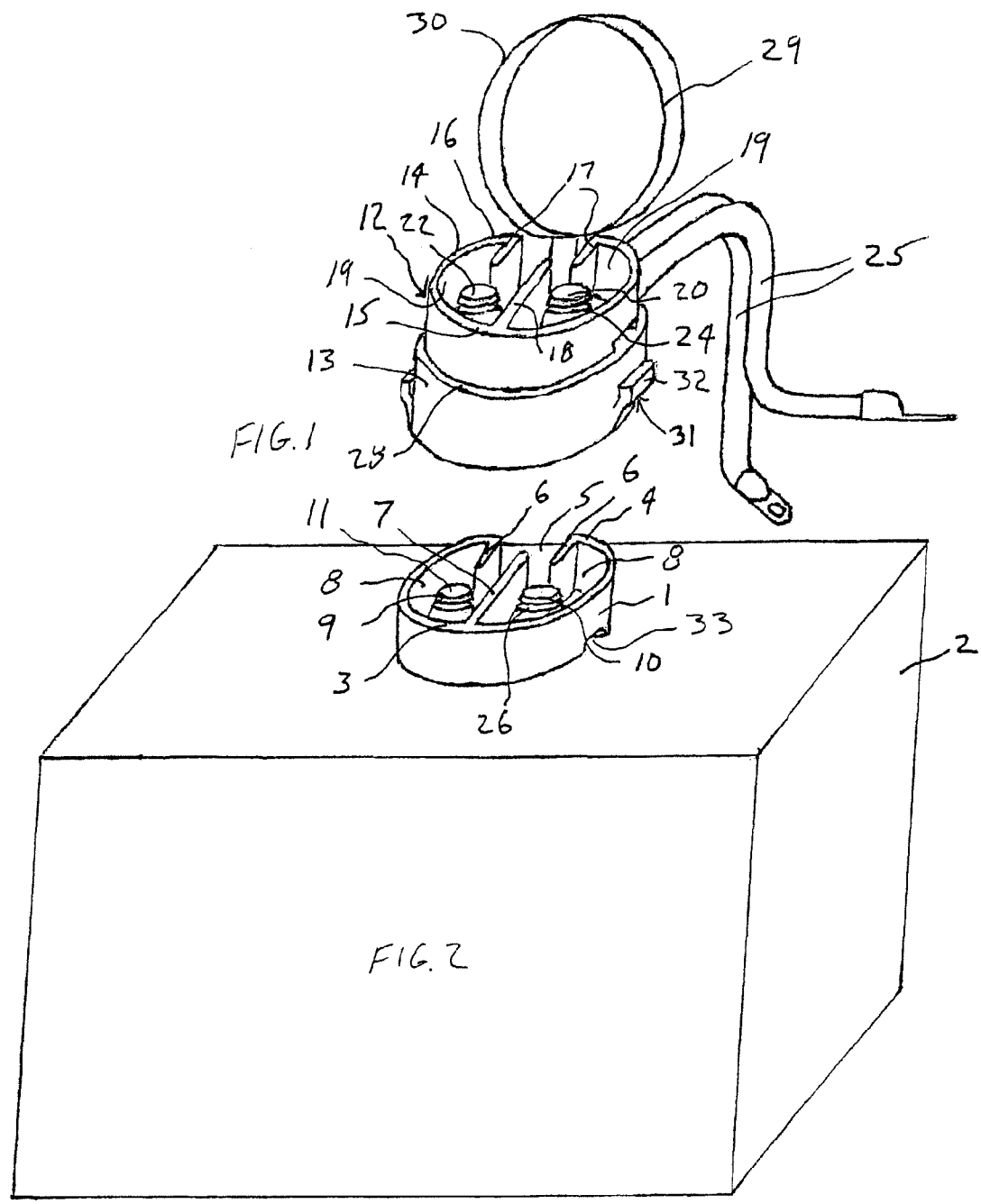

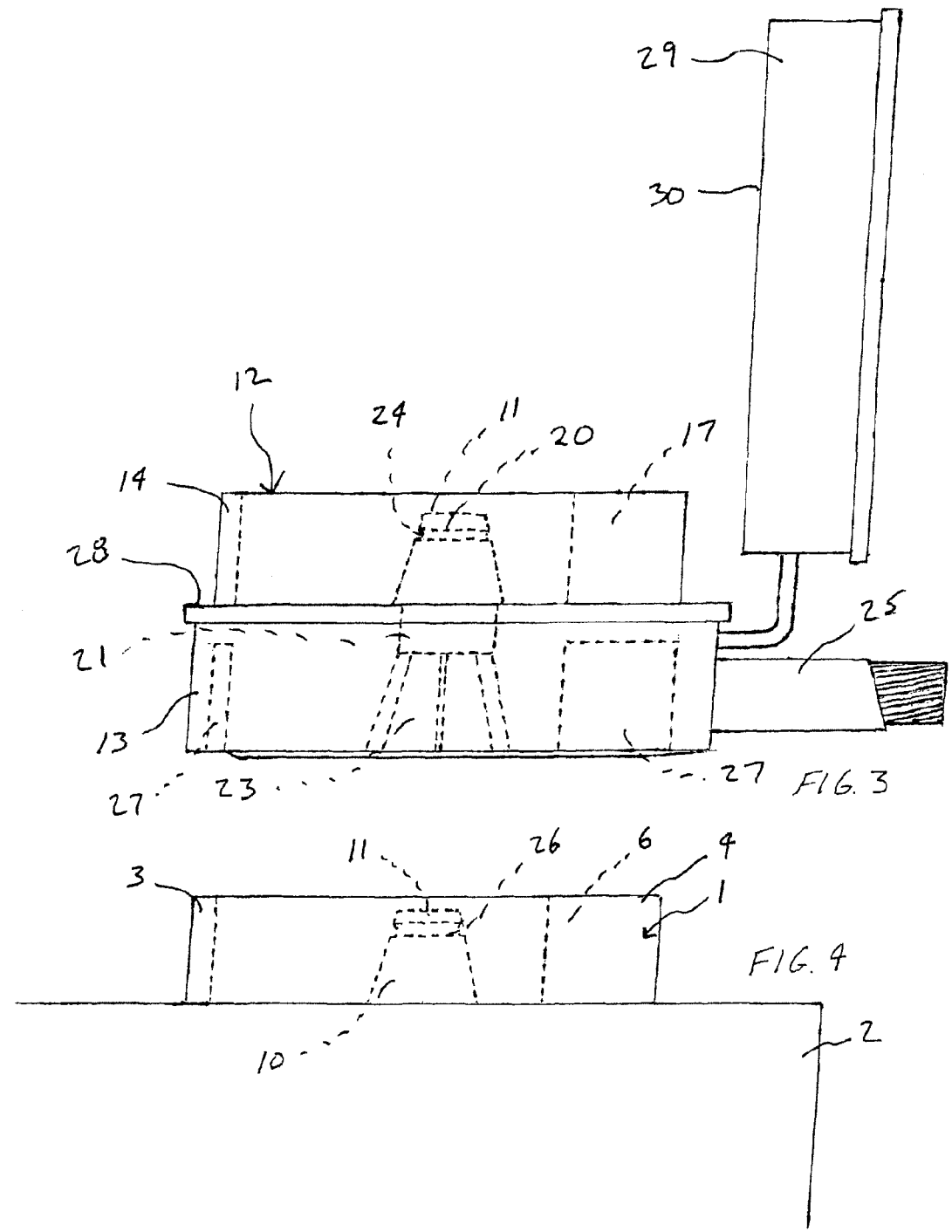

AUTOMOTIVE BATTERY CONNECTION SYSTEM

CROSS-REFERENCE TO RELATED APPLICATIONS

The instant application claims benefit of provisional application Ser. No. 61/513,773 filed Aug. 1, 2011, the contents of which are incorporated herein by reference.

BACKGROUND

1. Field of the Invention

The instant invention relates to automotive battery connection systems. In particular, this system allows for installation and connection of the battery without the use of tools.

2. Description of the Related Art

Replacing an automotive battery typically requires the use of a tool such as a wrench. The negative cable clamp is loosened with an 8 mm or 10 mm wrench for example then slid off the negative terminal. The positive terminal is thereafter loosened. This obviously takes time. Importantly also is that sometimes the battery cables are unmarked and must be labeled so they do not get mixed up, which would result in potential damages to the automobiles electric system should they be reversed. For the standard automotive battery it had also been important that the terminal sockets be disconnected sequentially beginning with the negative terminal socket to avoid short-circuiting the positive terminal to the grounded part of the car.

To avoid the above inherent problems related to time and risk of personal injury or damage to the vehicle, different battery connection systems have been taught. "Quick-connect" battery terminals are known in the art. For instance, U.S. Pat. No. 6,805,593 to Spaulding teaches a connector, wherein in order to electrically connect a cable to a post, the connector is pressed over a "blade" to snap the spring over the protrusions to provide a reliable electrical connection without the need for tools. U.S. Pat. No. 7,344,421 shows a circular bracket head. The bracket and quick connect/disconnect battery cable connector are disclosed to facilitate connection of a battery. U.S. Pat. No. 6,629,863 to Kieninger et al. shows another quick connection system wherein a battery terminal connector has a platform with a front end forming a post-receiving hole.

Still, however, the prior art connection systems are complicated and require a complete re-design and overhaul of the standard automotive battery and cable connection system. There is a need then for a quick-connect battery connection system which limits the changes to the standard automotive battery and eases the burden of replacement and re-charging.

BRIEF DESCRIPTION OF THE DRAWINGS

FIG. 1 shows a perspective view of the plug which connects to the battery.

FIG. 2 shows a perspective view of the battery with the instant battery case acting as the terminal which receives the plug.

FIG. 3 shows a side elevation view of the plug.

FIG. 4 shows a side elevation view of the battery case of the instant invention.

SUMMARY OF THE INVENTION

Figure 5:
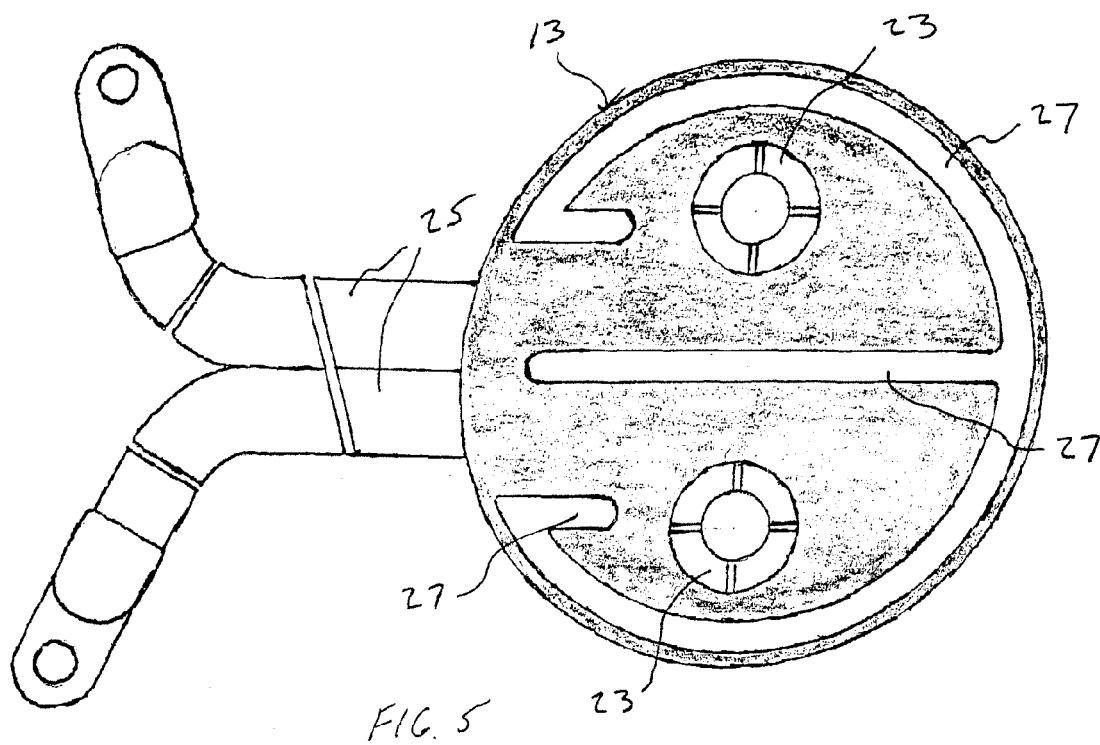
FIG. 5 shows a bottom plan view of the plug.

It is the objective of the instant invention to provide a battery connection system which eases the burden and time of replacing the battery.

It is further an objective to provide a battery connection system which eases the burden of recharging the battery when a jump is required.

It is further an objective to provide a battery connection system which eliminates the requirement for tools.

It is further an objective to provide a battery connection system which does not significantly deviate from the standard, two-post automotive battery design but yet still provides the above advantages.

Accordingly, what is provided is an automotive battery connection system, which includes a substantially cylindrical battery case acting as a terminal for an automotive battery. The case has a case front half and a case back half, the case back half having a keyway defined therein by a pair of keyway partitions projecting toward a center of the battery case, the battery case further including a center partition traveling over half of a diameter of the battery case and dividing the battery case into two case pockets. A battery positive post is situated within one of the case pockets. A battery negative post is situated in the other of the case pockets. Next, a substantially cylindrical plug is adapted to seat on the battery case. An upper portion of the plug has a plug back half including a channel defined therein by a pair of channel partitions projecting toward a center of the main portion and further includes a middle partition traveling over half of a diameter of the upper portion dividing the upper portion also into two plug pockets. The plug further including a base formed below the upper portion and integral thereto, and a pair of sockets are defined within the base, each socket defined within one of the plug pockets shaped identical to the battery positive post and the battery negative post and sized to have the battery positive post and the battery negative post securely seat therein. A plug negative post situated within the upper portion in one of the plug pockets includes a first stem extending downward into the base and attached to a respective one of the sockets. A plug positive post is then situated within the upper portion in the other of the plug pockets, the plug positive post attached to a respective one of the sockets. Therefore, cables terminating within the base of the plug are in conductive communication with the sockets when the plug is engaged to the battery case by way of its aligned sockets and posts, wherein electric energy can be supplied from the battery to the cables.

DETAILED DESCRIPTION OF THE PREFERRED EMBODIMENT

The invention will now be described in detail in relation to a preferred embodiment and implementation thereof which is exemplary in nature and descriptively specific as disclosed. As is customary, it will be understood that no limitation of the scope of the invention is thereby intended. The invention encompasses such alterations and further modifications in the illustrated assembly, and such further applications of the principles of the invention illustrated herein, as would normally occur to persons skilled in the art to which the invention relates. This detailed description of this invention is not meant to limit the invention, but is meant to provide a detailed disclosure of the best mode of practicing the invention. "A" or "an" as used in the disclosure and claims means one or more.

With reference then to FIGS. 1-4, shown is an automotive battery connection system, which generally includes two sub-assemblies. The first sub-assembly is a battery case 1 acting as a terminal for an automotive battery 2, disposed on the top of the battery 2 just as the typical terminals are arranged. However, in this embodiment the terminal posts are located close to each other, specifically 1¾" center to center in this particular embodiment. The terminal posts are of lead construction and as compared to traditional battery posts are more cone-shaped preferably truncated with a flat top. The terminal posts herein are also confined within a substantially cylindrical battery case 1, as further described. It should be understood that the shape of the case 1 may vary as well as the distance between the terminal posts although a compact, symmetrical formation is preferred.

The case 1 has a case front half 3 and a case back half 4. The case back half 4 has a keyway 5 defined therein, which is a channel defined by a pair of upstanding keyway partitions 6 which break away from the cylindrical battery case 1 (hence "substantially cylindrical" is used with reference to the battery case 1) and project toward a center of the battery case 1. The front half, however, is integral throughout the entirety of its semi-circular shape. An upstanding center partition 7 travels over half of the diameter of the battery case 1 to divide the battery case 1 into two, equal case pockets 8. As shown, the center partition 7 approaches the beginning of the keyway 5 and stops just shy of the entire outside diameter of the battery case 1. The exact length of the center partition 7 may vary, but preferably is more than one-half the diameter of the battery case 1 so as to better engage the plug 12 while simultaneously shielding the terminals. In other words, the combination of partitions 6, 7 reduce the chances of shorting the terminal posts and provide a keyway 5 to engage the connection plug that is attached to the battery cables, as further described.

With respect to the aforementioned terminal posts, more specifically, a battery positive post 9 is situated within one of the case pockets 8. A battery negative post 10 is situated adjacent to the battery positive post 9 in the other of the case pockets 8, separated from the battery positive post 9 by way of center partition 7. As shown the battery negative post 10 and battery positive post 9 are of a truncated cone shape having a flat top 11. Each post 10, 11 also includes a battery post groove 26 defined near a top thereof encircling the circumference. These shallow grooves 26 around the outside of the posts 9, 10 make it possible to utilize conventional jumper cables if necessary as it aids in the fixation of the jumper cable clamp which would be desirable because of the taper of the posts 9, 10.

The second sub-assembly comprises a plug 12. The plug 12 is also preferably substantially cylinder just as the battery case 1. The plug 12 is made up of two portions, namely a base 13 and an upper portion 14. Upper portion 14 is formed integral to the base 13 and above the base 13, slightly smaller in circumference than the base 13. The upper portion 14 has a plug front half 15 and plug back half 16. Much like the battery case 1, the plug back half 16 has a channel 17a defined therein by a pair of channel partitions 17 projecting toward a center of the upper portion 14. Further included is a middle partition 18 traveling over half of a diameter of the upper portion 14 and dividing the upper portion 14 also into two plug pockets 19, also similar to the battery case 1.

A pair of sockets 23 are defined within the base 13 defined upward from the underside of the base 13 traveling up into the base 13. Each socket 23 is defined underneath one of the plug pockets 19 and shaped identical to the battery positive post 9 and the battery negative post 10, respectively. Each socket 23 is sized to have the battery positive post 9 and the battery negative post 10 of the underlying battery case 1 securely seat therein and remain snug by friction. More specifically, each socket 23 is lined with lead that is segmented longitudinally (see FIG. 5) to facilitate expansion in the rubber during engagement with the conical posts. As the base 13 of plug 12 is pressed down on the battery case 1, it engages the center partition 7 and keyway partitions of the battery case 1 thereby isolating the posts inside (battery positive post 9 and battery negative post 10 as termed). As further pressure is applied, the matching, conical female sockets 23 engage the conical posts concentrically causing the segmented lead surface to expand within the rubber mold. At this point a catch 31 can be engaged which secures the plug 12 in place while maintaining pressure at the point of connection.

The catch 31 as a means for locking the plug 12 in place may take various forms such as a clip or tab. As shown on FIGS. 1 and 2 only, the base 13 includes a pair of levers 32. Each lever 32 is attached to a tab (not shown), and the tab is disposed on the inside of the battery case 1 at the bottom thereof and is configured to engage a slot 33 within the battery case 1 such that when the lever 32 is pushed forward toward the battery case 1 the tab also flexes and can be removed from the slot 33. But a necessarily tight electrical connection with minimal surface to surface friction occurs with or without the locking means.

A plug negative post 20 is situated within the upper portion 14 in one of the plug pockets 19. A first stem 21 is formed integral to the plug negative post 20 in conductive communication therewith and extends downward into base 13 to integrally attach to a respective one of the aligned sockets. A plug positive post 22 is then situated within the upper portion 14 in the other of the plug pockets 19, the plug positive post 22 attached to the other respective socket in the same manner as the plug negative post 20.

Figure 6:
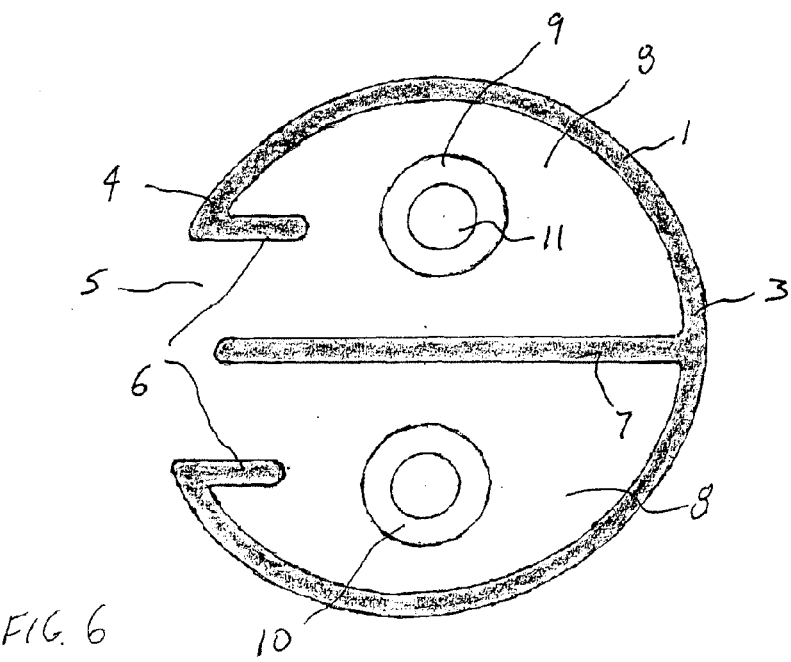
FIG. 6 shows a top plan view of the battery case.

FIG. 5 shows the underside of the base 13 of the plug 12 which engages over top of the battery case 1, the top view of which is shown in FIG. 6. Base 13 has defined therein counterpart hollow portions 27 which are indentations shaped to match the battery case 1 structures, namely the case front half 3, case back half 4, the keyway 5, and the center partition 7. Since each of these battery case 1 structures are raised-up solid members relative to the bottom of the battery case 1 within the battery case 1, they are configured to seat within the counterpart hollow portions 27 of the base 13 when the base 13 is aligned with and pressed down onto the battery case 1. As a result, the sockets 23 are also aligned and engage with the battery positive post 9 and battery negative post 10.

Accordingly, a pair of side-by-side cables 25 also terminate within the base 13 of the plug 12, attached within the plug 12 to each lead socket 23. The cables 25 conductively engage the sockets 23 by any conductive connection means such as an extending wire or bus bar. Therefore, the cables 25 are in conductive communication with the sockets 23 when the plug 12 is engaged to the battery case 1 by way of its aligned sockets 23 and posts 9, 10, wherein electric energy can be supplied from the battery 2 to the cables 25. Furthermore, the exposed, upper portion-residing plug negative post 20 and plug positive post 22 can be used for the jump starting of another car that is similarly equipped with this "concentric cone" battery connection system. The jumper cable may have ends identical to the plug positive post 22 and plug negative posts 20 mentioned above. These "jumper terminals" within the plug 12 are covered and protected when not in use by a round, heavy rubber cap 29. Although the plug 12 preferably is substantially cylindrical, the upper portion 14 has an outer diameter (and circumference) which is less than an outer diameter (and circumference) of the base 13 of the plug 12, wherein a ridge 28 is formed between the upper portion 14 and the base 12. In this manner, the aforementioned cap 29 having a bottom edge 30 is hingedly attached to the base 13 of the plug 12 and is configured to fold down onto and cover the upper portion 14 with its bottom edge 30 in contact with the ridge 29, thereby providing an aesthetic appearance and smooth transition from the base 13 to the upper portion (plug) 14. The "jumper terminals" can be labeled and identified as positive and negative for clamp-on jumper cables or battery chargers, and just as the battery positive post 9 and battery negative post 10, each jumper terminal has defined thereon a plug post groove 24 defined near a top thereof encircling the circumference to aid in the connection of a jumper cable.

I claim:

1. An automotive battery connection system, comprising:
   a battery case acting as a terminal for an automotive battery, said case having a case front half and a case back half, said case back half having a keyway defined therein by a pair of keyway partitions projecting toward a center of said battery case, said battery case further including a center partition dividing said battery case into two case pockets;
   a battery positive post situated within one of said case pockets;
   a battery negative post situated in the other of said case pockets;
   a plug, said plug further including a base and an upper portion formed integral to said base and above said base, said base configured to connect to said battery case;
   a pair of sockets defined within said base, each said socket shaped identical to said battery positive post and said battery negative post sized to have each said battery positive post and said battery negative post securely seat therein, each said socket lined with a conductive material;
   cables terminating within said base of said plug in conductive communication with said sockets, wherein electric energy can be supplied from said battery to said cables.

2. The automotive battery connection system of claim 1, further comprising:
   a plug negative post situated within said upper portion, said plug negative post including a first stem extending downward into said base and attached to a respective one of said sockets; and,
   a plug positive post situated within said upper portion, said plug positive post attached to the other respective one of said sockets.

3. The automotive battery connection system of claim 2, further comprising a plug post groove defined on each said plug positive post and said plug negative post.

4. The automotive battery connection system of claim 2, wherein said plug includes a plug front half and plug back half, said plug back half having a channel defined therein by a pair of channel partitions projecting toward a center of said plug, said plug further including a middle partition dividing said plug into two plug pockets, wherein said plug negative post is disposed within one of said plug pockets and said plug positive post is disposed in the other of said plug pockets.

5. The automotive battery connection system of claim 1, further comprising a battery post groove defined on each said battery positive post and said battery negative post near a top thereof.

6. The automotive battery connection system of claim 1, wherein said plug is substantially cylindrical and said upper portion has an outer diameter which is less than an outer diameter of said base of said plug, wherein a ridge is formed between said upper portion and said base.

7. The automotive battery connection system of claim 6, further comprising a cap, said cap having a bottom edge and hingedly attached to said base of said plug configured to fold down onto and cover said upper portion with said bottom edge in contact with said ridge.

8. The automotive battery connection system of claim 1, wherein said base has defined on a underside thereof counterpart hollow portions shaped to match and receive said case front half, said case back half, said keyway partitions, and said center partition.

9. The automotive battery connection system of claim 1, further comprising a locking means for maintaining said plug on said battery case.

10. An automotive battery connection system, comprising:
    a substantially cylindrical battery case acting as a terminal for an automotive battery, said battery case further including a center partition dividing said battery case into two case pockets;
    a battery positive post situated within one of said case pockets;
    a battery negative post situated in the other of said case pockets;
    a substantially cylindrical plug including a base and an upper portion formed integral to said base and above said base;
    a pair of sockets defined within said base, each said socket shaped identical to said battery positive post and said battery negative post sized to have each said battery positive post and said battery negative post securely seat therein, each said socket lined with a conductive material;
    a plug negative post situated within said upper portion, said plug negative post including a first stem extending downward into said base and attached to a respective one of said sockets;
    a plug positive post situated within said upper portion adjacent to said plug negative post, said plug positive post attached to the other respective one of said sockets; and,
    cables terminating within said base of said plug in conductive communication with said sockets, wherein electric energy can be supplied from said battery to said cables and from said battery to a set of jumper cables.

11. The automotive battery connection system of claim 10, wherein said case has a case front half and a case back half, said case back half having a keyway defined therein by a pair of keyway partitions projecting toward a center of said battery case.

12. The automotive battery connection system of claim 10, wherein said plug has a plug front half and plug back half, said plug back half having a channel defined therein by a pair of channel partitions projecting toward a center of said plug, said plug further including a middle partition traveling over half of a diameter of said plug and dividing said plug into two plug pockets.

13. The automotive battery connection system of claim 10, wherein said upper portion has an outer diameter which is less than an outer diameter of said base of said plug, wherein a ridge is formed around said upper portion on said base.

14. The automotive battery connection system of claim 13, further comprising a cap, said cap having a bottom edge and hingedly attached to said base of said plug configured to fold down onto and cover said upper portion with said bottom edge in contact with said ridge.

15. The automotive battery connection system of claim 11, wherein said base has defined on a underside thereof counterpart hollow portions shaped to match and receive said case front half, said case back half, said keyway partitions, and said center partition.

16. The automotive battery connection system of claim 10, further comprising a locking means for maintaining said plug on said battery case.

17. The automotive battery connection system of claim 10, further comprising a battery post groove defined on each said battery positive post and said battery negative post near a top thereof.

\* \* \* \* \*